T. R. McKNIGHT.
DUMP CAR.
APPLICATION FILED MAR. 19, 1917.

1,327,623.

Patented Jan. 13, 1920.
7 SHEETS—SHEET 1.

Witness:
L. B. Graham

Inventor:
Thomas R. McKnight,
By Adams Jackson,
Att'ys.

T. R. McKNIGHT.
DUMP CAR.
APPLICATION FILED MAR. 19, 1917.

1,327,623.

Patented Jan. 13, 1920.
7 SHEETS—SHEET 5.

Witness
L. B. Graham

Inventor:
Thomas R. McKnight
By Adams & Jackson
Att'ys

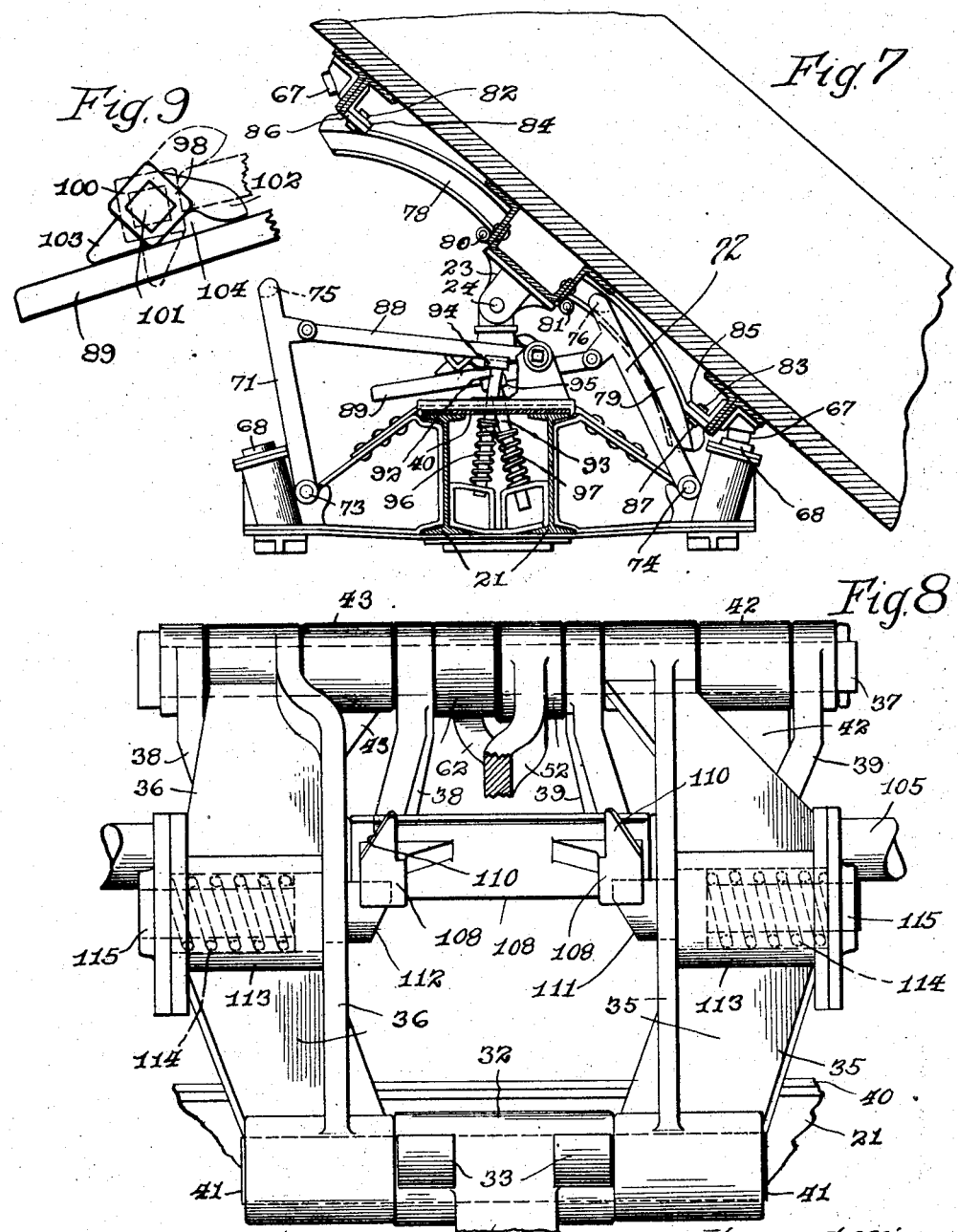

T. R. McKNIGHT.
DUMP CAR.
APPLICATION FILED MAR. 19, 1917.
1,327,623.
Patented Jan. 13, 1920.
7 SHEETS—SHEET 7.
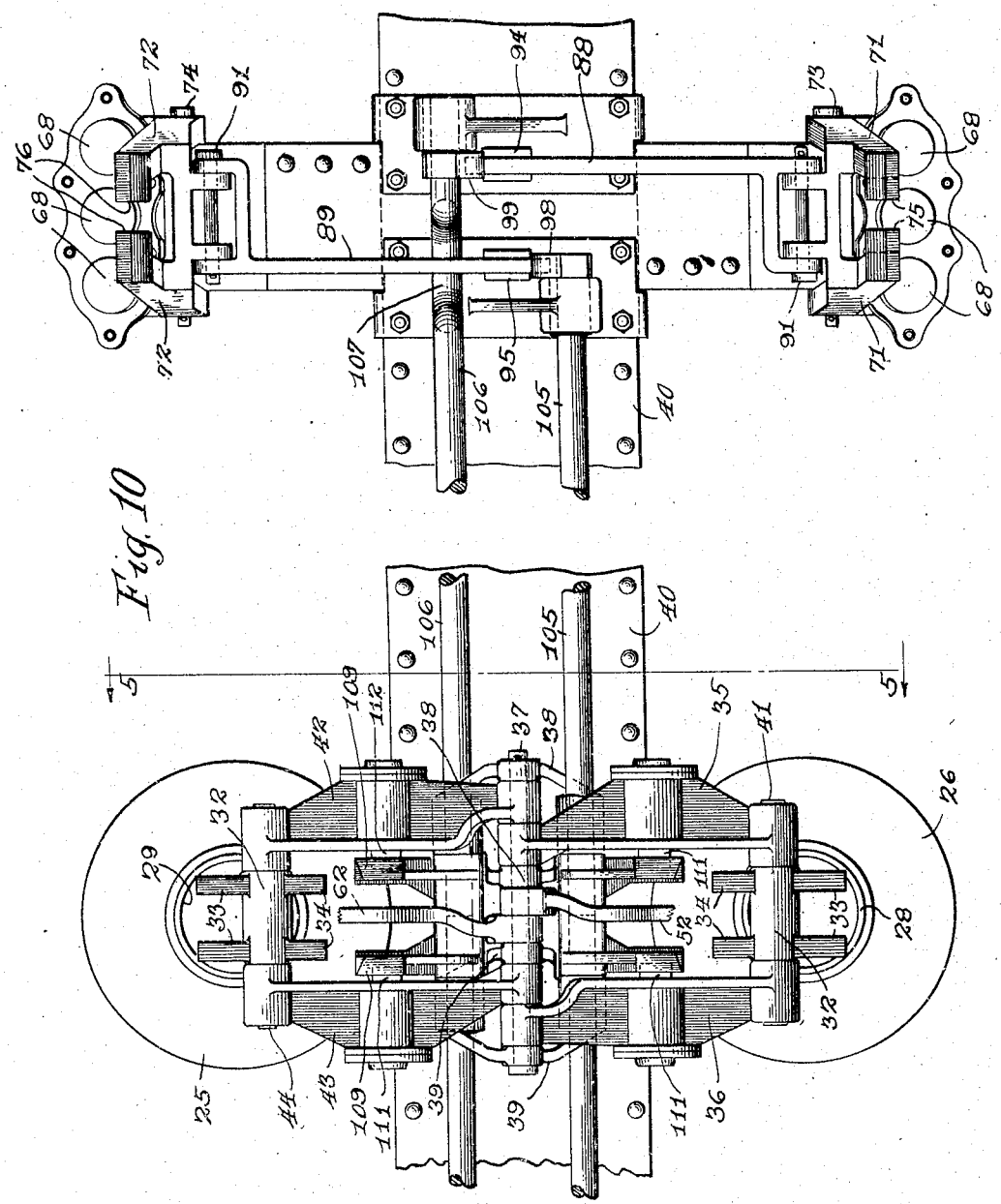

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

1,327,623.   Specification of Letters Patent.   Patented Jan. 13, 1920.

Application filed March 19, 1917. Serial No. 155,839.

*To all whom it may concern:*

Be it known that I, THOMAS R. MC-KNIGHT, a citizen of the United States, and a resident of Aurora, in the county of Kane and State of Illinois, have invented certain new and useful Improvements in Dump-Cars, of which the following is a specification, reference being had to the accompanying drawings.
My invention relates to dump-cars, and particularly to cars of that class in which the car bed is arranged to be tilted to discharge its load at either side of the running gear, the operations of tilting the bed and restoring it to normal or carrying position being effected by compressed-air-operated mechanism. The object of my invention is to provide certain improvements in cars of the class referred to, such improvements relating to the mechanism for tilting and restoring the car bed, the devices for locking the car in its normal position, and the mechanism by which such locking devices are actuated to release the bed to permit the load to be dumped. The construction by which I embody such improvements is well adapted for use in building cars of any capacity, the accompanying drawings showing approximately the dimensions of the several parts of the mechanism as embodied in a car having a bed approximately twenty-six feet long.

In the accompanying drawings,—

Fig. 7 is a partial sectional view taken substantially on line 3—3 of Fig. 2, showing the bed in tilted position and the positions occupied by the locking devices under such conditions;

Fig. 8 is an enlarged detail illustrating certain parts of the mechanism by which the car bed is operated in tilting it and restoring it to its normal position;

Fig. 9 is a detail illustrating a part of the locking mechanism by which the car bed is normally held against tilting when in operative position;

Fig. 10 is a partial plan view illustrating the construction and arrangement of the devices for operating the car bed and the locking mechanism by which the position of the car bed is controlled.

Referring to the drawings,—

Figure 1:
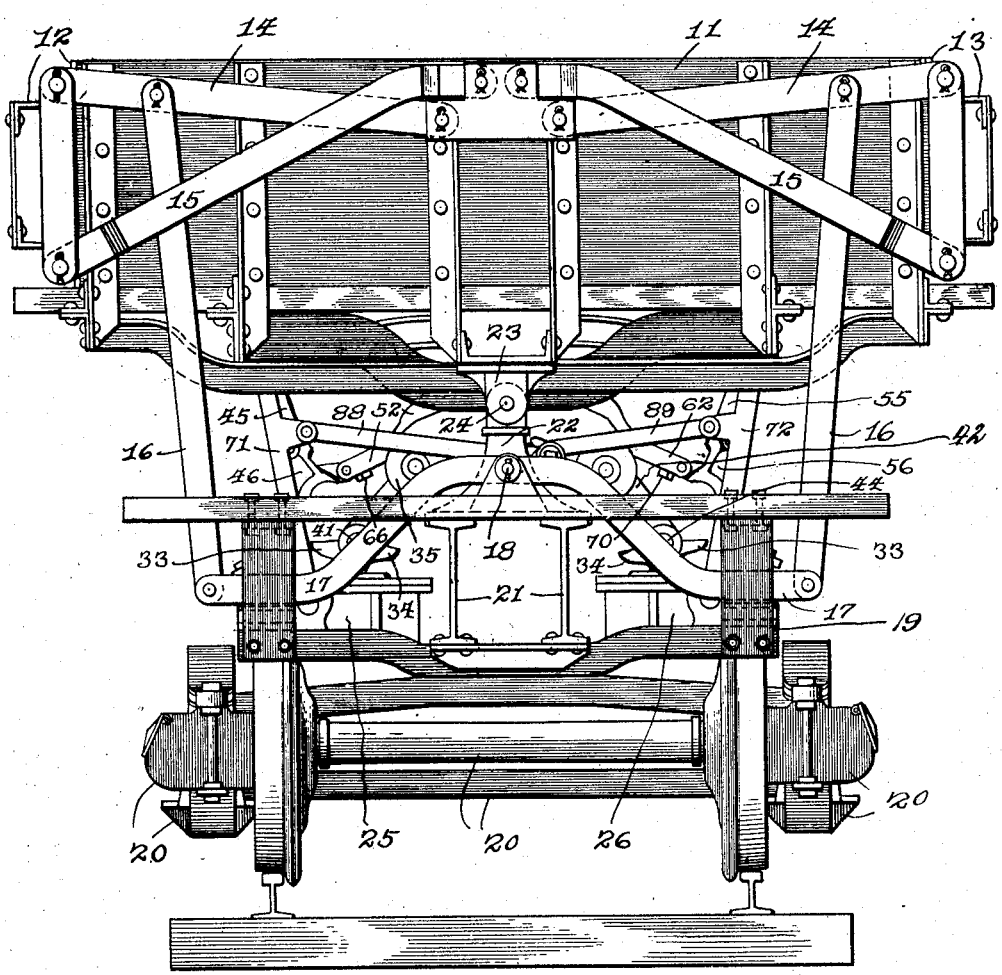
Figure 1 is an end elevation of a dump-car embodying the improvements which constitute the subject-matter of this application.
Figure 2:
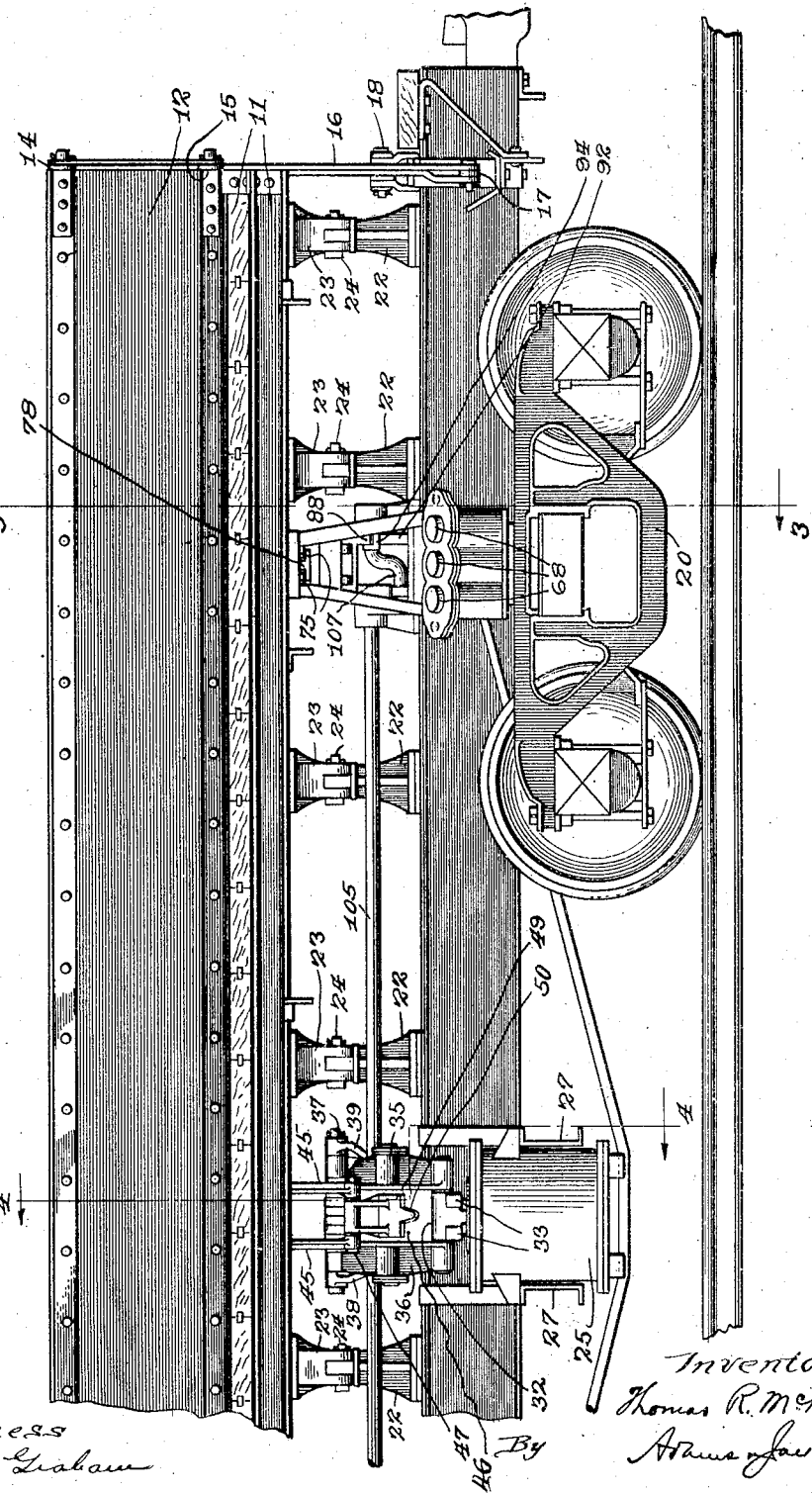
Fig. 2 is a partial side view thereof, showing somewhat more than half the length of the car.
Figure 4:
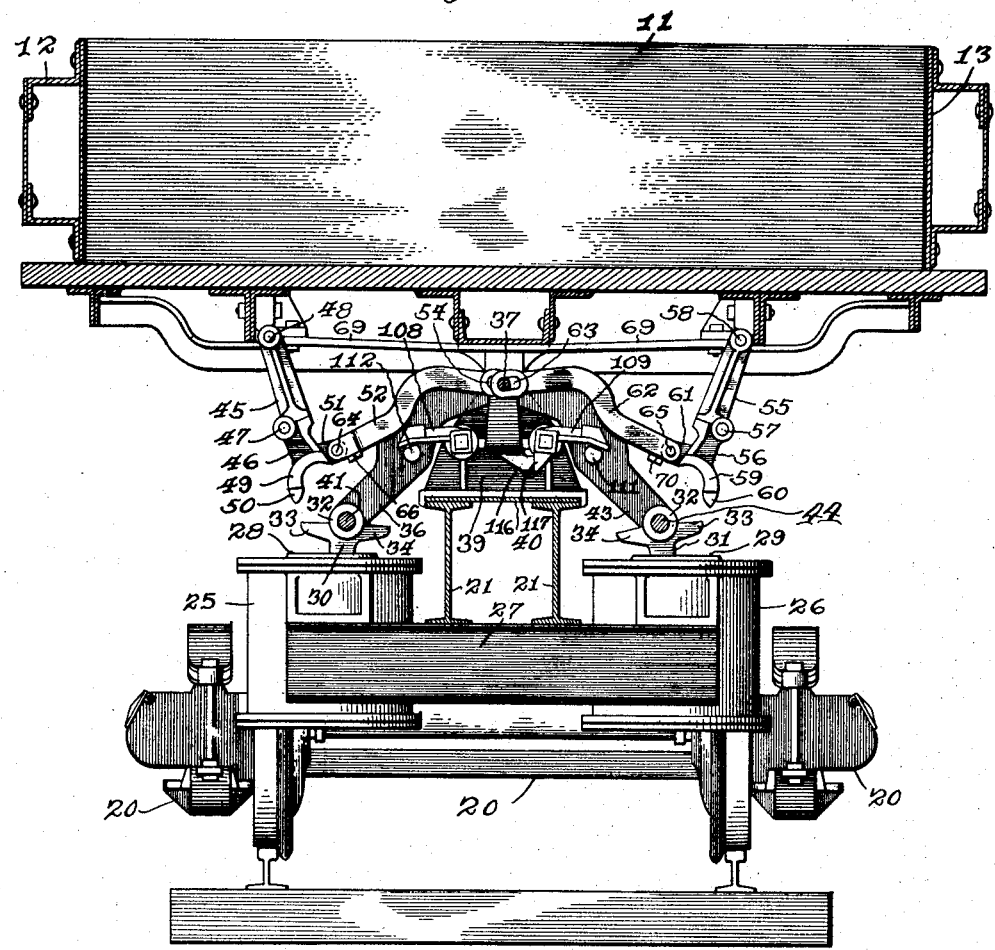
Fig. 4 is a cross-section on line 4—4 of Fig. 2.

11 indicates the car bed, which is of the well-known type having side gates 12—13 each of which is carried by a pair of pivoted straps 14—15, the straps 14 being connected to bars 16 disposed approximately vertically and pivotally connected at their lower ends with swinging links 17 mounted upon a pivot 18 at the transverse center of the car. The outer end portions of the links 17 rest upon the under frame 19 of the car, which prevents downward movement of said links below the position shown in Fig. 1, and consequently when the bed is tilted in dumping its load the side gate at the side at which the load is dumped is held up by the bars 16, which are at the ends of the car, and consequently the load may freely be discharged. The side gate at the opposite side of the car is carried up as that side of the car rises, the bars 16 and links 17 at that side of the car swinging upward correspondingly. When in operative position the side gates rest on the side sills of the car bed, in the usual way. The under body of the car comprises the usual trucks 20 placed adjacent to the ends of the car, and a pair of longitudinally-disposed I-beams 21 which connect the trucks and are braced in any suitable way. The I-beams 21, or any suitable equivalent devices, support a series of standards 22 which coöperate with rockers 23 carried by the car bed to form rocking supports for the car bed, said supports having pivots 24, as shown in Fig. 2. These rocking supports underlie the transverse center of the car bed so that the bed may be tilted at either side. Preferably, said supports are made separable in any well-known way so that the car bed may be removed if desired. The parts thus far described are old. 25—26 indicate two cylinders one at each side of the car at the longitudinal center thereof, said cylinders being supported by cross-beams 27 secured to the I-beams 21, as shown in Fig. 4. 28—29 indicate plungers fitted to operate in the cylinders 25—26, respectively. Said plungers are arranged to be projected upwardly when compressed air is admitted to their respective cylinders. The mechanism for admitting compressed air to the cylinders 25—26 and for exhausting it therefrom forms no part of my present invention, and it will be understood that any suitable apparatus for the purpose, arranged either to provide individual control for each car or general control from the cab of the locomotive—both of which modes of operation are well known—may be employed. The function of the plungers 28—29 is to tilt the car bed from its normal position to discharge the load and also to restore the car bed to normal position after it has been tilted, the plunger at one side being used for the first operation and that at the other side for the second operation. The mechanism by which these operations are effected will now be described.

30—31 indicate plunger or push-rods, which are mounted in the plungers 28—29, respectively, their lower ends being pivotally connected with said plungers so that said push-rods may rock transversely of the car. Said push-rods are provided at their upper ends with sleeves 32 and with oppositely-extending lugs 33—34, as best shown in Figs. 4 and 10. 35—36 indicate a pair of arms which at their inner ends are pivoted upon a shaft 37 which is in alinement with the pivots 24 upon which the car bed rocks, as shown in Fig. 2. Said shaft is preferably supported by a pair of bifurcated brackets 38—39 mounted upon the I-beams 21 and resting upon a plate 40 carried by said I-beams, as shown in Figs. 4 and 10. The outer ends of said arms 35—36 are adapted to aline with the sleeve 32 and carry a pivot 41 which has a bearing in said sleeve, as shown in Fig. 10. The arms 35—36 are spaced a suitable distance apart to accommodate certain other parts of the apparatus, as will hereinafter appear. It will be apparent from the foregoing description that said arms 35—36 will swing about their pivot 37 when the push-rod 30 is raised or lowered by the projection or retraction of the plunger 28, and also that said arms will act to swing the upper end of the push-rod 30 transversely as it moves up or down. In like manner, the push-rod 31 is connected with arms 42—43 also pivoted upon the shaft 37 and connected with the push-rod 31 by a pivot 44.

45—46 indicate the upper and lower members, respectively, of a thrust-bar, said members being connected by a knuckle-joint of which 47 is the pivot. The upper member 45 is pivotally connected to the car bed between the transverse center thereof and one of its side margins by a pivot 48 so that said thrust-bar may swing transversely of the car. The lower member 46 is provided with a head 49 the lower surface of which is provided with a concave recess adapted to fit upon the outer surface of the sleeve 32 which forms a bearing for it. The outer extremity of said head is provided with a finger 50, the purpose of which will hereinafter be described. The inner portion of the head 49 is provided with a projecting lug 51 by which it is connected with a link 52 pivoted at its inner end upon the shaft 37, said link being provided with an elongated or elliptical slot 54 to permit limited longitudinal movement of the link independently of said shaft 37, as shown in Fig. 4. The function of the link 52 is to control the position of the members of the thrust-bar, as will hereinafter be more specifically described. At the other side of the car the same equipment is provided. 55—56 indicate the upper and lower members of the thrust-bar at that side, 57 the pivot connecting said members together, 58 the pivot connecting the upper member 55 with the car, 59 the head carried by the lower member 56, 60 the finger carried by said head, 61 the lug corresponding with the lug 51, 62 the link for said thrust-bar, and 63 the elongated slot in the link 62 by which it is pivoted to the shaft 37. 64 indicates a pivot connecting the link 52 with the lug 51, and 65 indicates the corresponding pivot at the opposite side of the car. Normally, when the car bed is in operative position and the plunger 28 is retracted, the parts occupy the position shown in Fig. 4.

Figure 5:
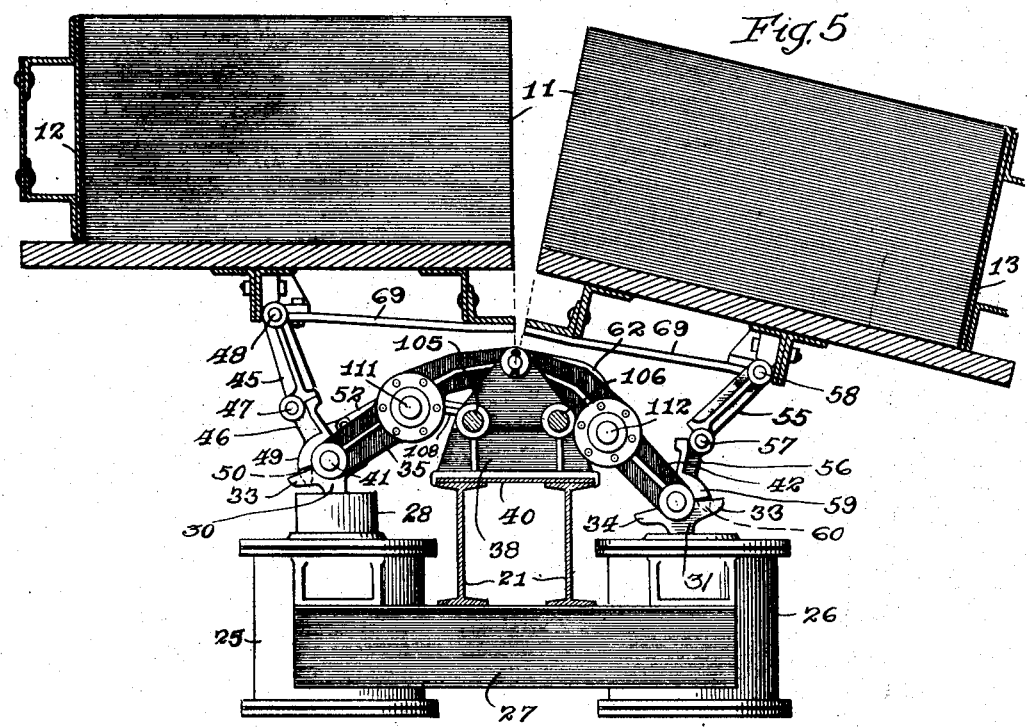
Fig. 5 is substantially a cross-section on line 5—5 of Fig. 10, showing one-half the car bed in normal position and the other half in a partly tilted position;
Figure 6:
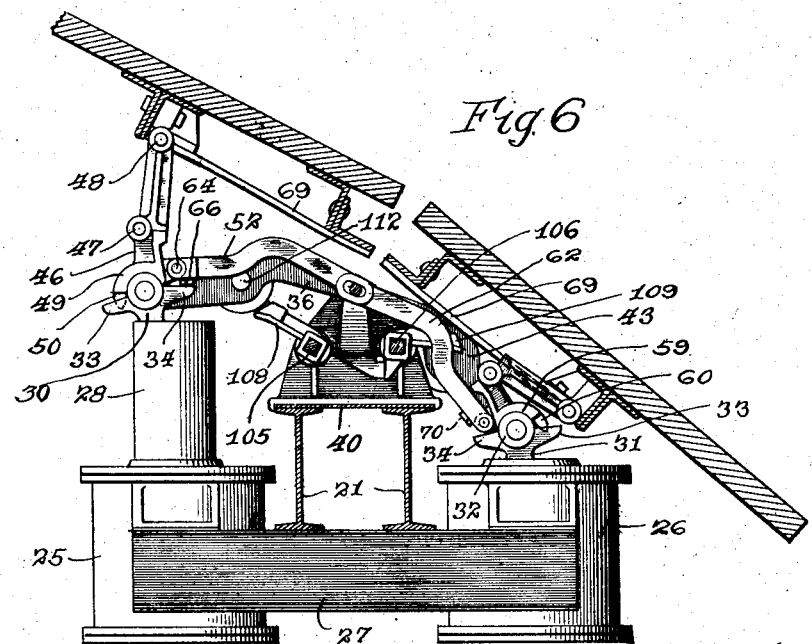
Fig. 6 is a similar view, certain parts being omitted, showing changed positions of the two halves of the bed and the mechanism connected therewith.

Assuming that air is admitted to the left-hand cylinder 25, the plunger 28 will be forced up, thereby carrying the sleeve 32 into engagement with the head 49, as shown at the left in Fig. 5. It will be noted that at this time the push-rod 30 is swung to the left by the action of the arms 35—36 so that the sleeve 32 properly engages said head. At the same time the finger 50 passes between the lugs 33. At this time the line of thrust between the pivots 41 and 48 will lie inside of the pivot 47 of the knuckle-joint, as clearly shown at the left-hand side in Fig. 5, and consequently said joint cannot break and the lifting force will be transmitted along an upwardly and outwardly inclined line to the left-hand side of the car bed. As the plunger 28 rises the car bed will continue to swing over toward the right and the pivot 48 of the thrust-bar will be carried over to a position more nearly directly over said plunger, as shown at the left-hand side of Fig. 6, at which time the pivot 47 of the knuckle-joint will approach the line of thrust, and in order to insure against premature breaking of the knuckle-joint, the link 52 is provided with a cross-bar or block 66 on its under side adjacent to the lugs 51, which block is adapted to be engaged by the lugs 34 carried by the push-rod 30 (see Figs. 4 and 6). This has the effect of keeping the line of thrust inside the pivot 47, and consequently the joint cannot break during the tilting operation. As soon as the car bed has been tilted far enough so that it overbalances, which occurs when the plunger 28 reaches the upper limit of its movement, the car bed continues to go over by gravity until it reaches the limit of its movement, which is determined by bumpers 67 carried by the car bed and adapted to engage bumpers 68 carried by the trucks. The position of the push-rod 31 at the right-hand side of the car and the parts coöperating therewith when the car bed has been dumped to the right, is shown at the right in Fig. 6. As will be seen from said figure, at that time the push-rod 31 is drawn over to the left by the arms 42—43, the members 55 and 56 of the thrust-bar are folded together, and the head 59 rests upon the sleeve 32. Before the bed assumes this position it is necessary, of course, that the members 55—56 of the right-hand thrust-bar shall fold, and at the right in Fig. 5 an early stage of this folding operation is illustrated. When the dumping operation is commenced, said members are in alinement, as shown at the right in Fig. 4, and retain this position until the downward movement of the right-hand side of the bed carries the finger 60 down into engagement with the lugs 33 carried by the push-rod 31. It will be noted that said finger and the adjacent portion of the head 59 extend out a considerable distance beyond the pivot 57, and consequently said parts when they come into engagement with the lugs 33 act to rock the lower member 56 about the pivot 57, breaking the joint, as shown at the right in Fig. 5, at which time the head 59 comes into engagement with the sleeve 32 carried by the push-rod 31. Farther downward movement of the right-hand side of the bed continues the folding of said members until finally the position shown at the right in Fig. 6 is reached.

When the bed is to be restored to normal position after the load has been discharged to the right, air is admitted to the cylinder 26, forcing plunger 29 upward. The push-rod 31 is accordingly moved upward and at the same time rocked outward by the arms 42—43 until the upper surface of the head 59 engages the under side of the bed, or rather a cross-bar or brace 69 secured to the under side of the car bed, as best shown in Fig. 4. It should be explained that each of the upper members 45 and 55 of the two thrust-bars is composed of two bars spaced apart, as shown in Fig. 2, said bars being set between the pairs of arms 35—36 and 42—43 respectively, and far enough apart so that the push-rod sleeves 32 and the heads 49—59 can pass between them into engagement with said cross-bar 69. As the push-rod 31 is moved upward, it therefore raises the low side of the bed, swinging it about its pivots until finally it is restored to its horizontal position. The descent of the plunger 29 permits the members of the thrust-bar to again come into alinement under the action of gravity. The link 62 is provided with a cross-bar 70 similar to the cross-bar 66.

Figure 3:
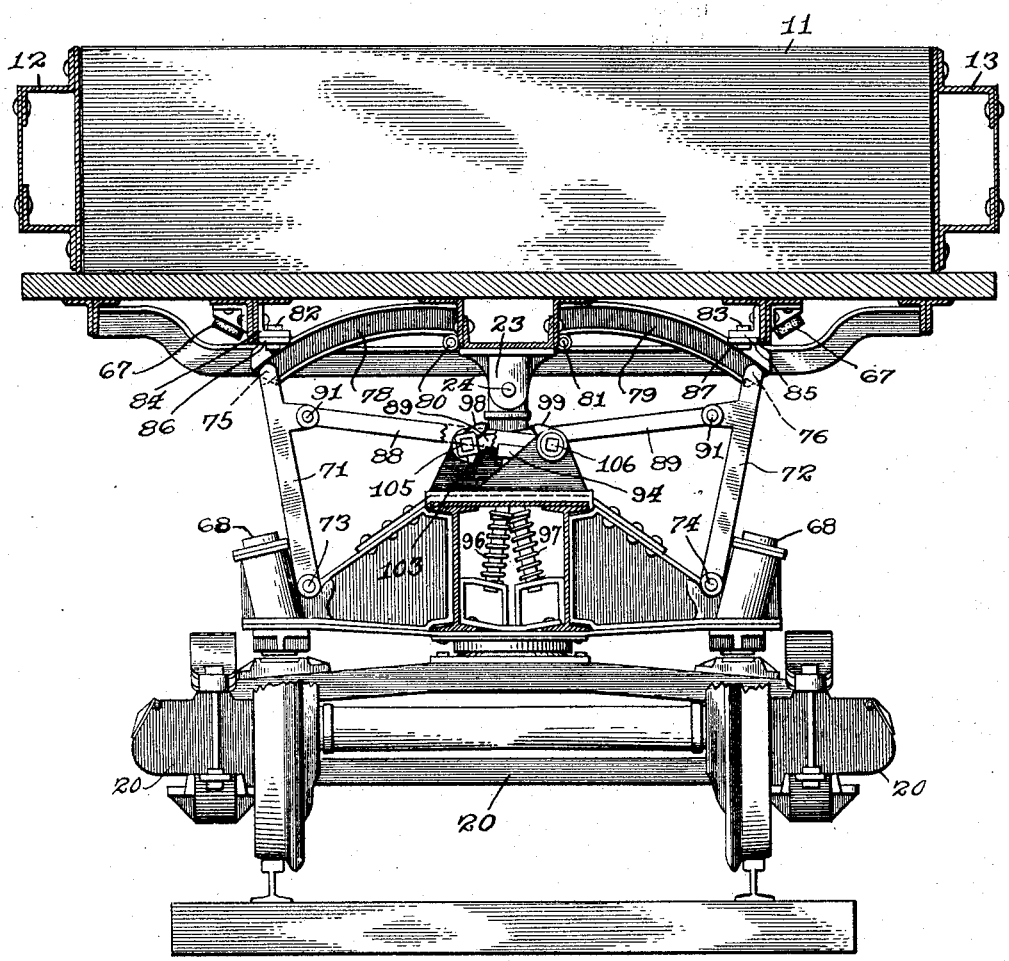
Fig. 3 is a vertical cross-section on line 3—3 of Fig. 2, certain parts being broken away.

The car bed is held in its horizontal position when in operation by means of locking-bars or struts 71—72, a pair of which are provided near each end of the car, said locking-bars being mounted upon pivots 73—74 at their lower ends and having laterally-projecting studs 75—76 at their upper ends, as best shown in dotted lines in Figs. 3 and 7. Said studs are adapted to travel in grooved guides 78—79 secured underneath the car bed in proper position to be engaged by said studs as the upper ends of the bars 71—72 move transversely of the car. Said guides in the construction illustrated are bars similar to I-beams having grooves at opposite sides of a central web, as illustrated in Fig. 2 and are mounted upon pivots 80—81 adjacent to their inner ends, their outer ends being secured by bolts 82—83 to suitable brackets 84—85 secured at the under side of the car bed, as shown in Fig. 3. Thus the outer ends of said guides may be adjusted vertically to compensate for wear by inserting a shim between said brackets 84—85 and ears 86—87 carried by the outer end portions of said guides, as shown in Figs. 3 and 7. These guides serve to move the upper ends of the locking bars 71—72 outward to operative position when the car bed is righted after it has been dumped, as well as to move the upper ends of said bars inward in the dumping operation. The locking-bars 71—72 are normally held in an approximately vertical position with their upper ends inclined outwardly, as illustrated in Fig. 3, by means of guide-bars 88—89 pivoted, respectively, to the bars 71—72 near the upper end portions thereof by pivots 90—91. Said guide-bars extend transversely of the car and are supported respectively by bolts 92—93 having grooved heads 94—95 in which said bars 88—89 slide. Said bolts are yieldingly sustained by springs 96—97, as shown in Fig. 7, so that they are capable of being depressed, but when released from pressure will be restored to their upwardly-projected position. The guide-bars 88—89 are normally held against inward movement longitudinally of themselves by latches 98—99, the construction of which is best shrown in Fig. 9. Each of said latches comprises a hub 100 having a non-circular, preferably square, socket 101, from which extend two lugs 102—103, with a recess 104 in the angle between the lug 102 and the hub 100. This recess is shaped to receive the end of the guide-bar 88 or 89, as the case may be, when the parts are in locking position, as shown in Fig. 3. The latches 98—99 are mounted, respectively, upon shafts 105—106 which extend longitudinally of the car near and at opposite sides of the transverse center thereof, as shown in Figs. 3 and 7, said shafts being mounted in suitable bearings supported by the I-beams 21. It will be understood that a pair of the locking-bars 71—72 with their respective guide-bars and latches are provided near each end of the car, the arrangement being substantially as shown in Fig. 2; and in order to permit movement of the guide-bars 88—89 transversely of the car as will be hereinafter described, each of the shafts 105—106 is provided at one end with a crank 107, as shown in Fig. 2, the crank of the shaft 105 being at the opposite end of the car from that of the shaft 106. When the inner ends of the guide-bars rest in the sockets 104, at which time the latches 98—99 are in the position shown in Fig. 3, it will be seen that the end thrust of said guide-bars is directly in line with the shafts 105—106, and consequently said guide-bars then act to hold the locking-bars 71—72 in their outermost position, as shown in Fig. 3. By rocking the shafts 105—106 in the appropriate direction, however, the lugs 102 may be turned down into engagement with the upper margins of said guide-bars, moving said bars downward until their ends disengage the recesses 104 and the parts assume the position shown in Fig. 9, at which time the lugs 102—103 ride on the upper margins of their respective guide-bars. This permits the guide-bars 88—89 to move transversely of the car, as shown at the right in Fig. 7, thereby permitting the upper ends of the locking-bars 71—72 to swing inwardly. For example, assuming that the shaft 105 is rocked in a clockwise direction according to the illustration in Fig. 3, the guide-bar 89 will be moved downward and can then move endwise under the latch 98, as illustrated in Figs. 7 and 9, thus permitting the locking-bar 72 to assume the position shown in Fig. 7 under the tilting action of the car bed. The other locking-bar 71 may retain its original position, as the action of each of the shafts 105—106 is independent of the other. It will be apparent, therefore, that before the car bed can be tilted in dumping, the appropriate shaft 105 or 106 must be rocked to release the guide-bar 88 or 89 which controls the locking-bars 71—72 at the side at which the load is to be dumped, and this is automatically accomplished by mechanism which will now be described.

108—109 indicate arms carried by the shafts 105—106, respectively, between the pairs of arms 35—36 and 42—43, as best shown in Fig. 10. Preferably, two of each of said arms are used, arranged adjacent to the inner faces of the pairs of arms 35—36 and 42—43, as shown in said figure and in Fig. 8. Each of said arms has a beveled portion 110 at its upper side, as clearly shown in Fig. 8, for a purpose which will presently appear. 111—112 indicate spring-projected bolts beveled at their inner ends, as shown in Fig. 8, which bolts are mounted in the arms 35—36 and 42—43, and project inwardly from the inner faces of said arms, as shown in Fig. 8 so that when the parts are in their normal position they underlie the arms 108—109, as best shown in Figs. 4, 8 and 10. The bolts 111—112 are fitted in suitable bearings 113 provided in the arms 35—36 and 42—43, springs 114 which project said bolts being also fitted in said bearings, as shown in dotted lines in Fig. 8. 115 indicate cap-plates which close the outer ends of said bearings so that the bolts and springs may be introduced from the outer sides of the arms which carry them. It will be apparent from the foregoing description that when the arms 35—36, for example, are swung upward by the action of the push-rod 30 the bolts 111—112 will swing the arms 108 upward, thereby rocking the shaft 105 and turning the latch 98 into the position shown in Fig. 9. This will release the guide-bar 89 and permit the locking-bar 72 to swing inward under the tilting action of the car bed, as shown in Fig. 7. When the shaft 105 has been rocked far enough so that the bolts 111—112 can slip off the outer ends of the arms 108, farther upward movement of the arms 35—36 will not affect the shaft 105, which, however, will retain its position owing to the fact that the lugs 102—103 will then bear upon the upper margin of the guide-bar 89 and so be locked against rotation. When this operation takes place, the locking-bar 71 will, of course, retain its normal position as its guide-bar 88 will remain in locking engagement with the latch 99. The descent of the plunger 28 and push-rod 30 while the car bed remains tilted to the right will not affect the position of the shaft 105 since the bolts 111—112 will have moved down past the outer ends of the arms 108 without operatively engaging them.

When the plunger 29 and push-rod 31 at the right-hand side of the car are projected to restore the car bed to its normal position, the bolts 111—112 carried by the arms 42—43 will engage the arms 109 carried by the shaft 106, and consequently rock said shaft to release the guide-bar 88, but said guide-bar will not move inward because the locking-bar 71 to which it is attached will remain in its normal position, as shown in Fig. 7, and therefore gravity will act to prevent inward movement thereof. As soon as the arms 42—43 swing far enough to carry the bolts 111—112 beyond the ends of the arms 109, said arms will drop back to their normal position, restoring the latch 99 to operative engagement with the guide-bar 88 and again locking the locking-bar 71 in operative position. This will leave the bolts 111—112 carried by the arms 42—43 above the arms 109, but when the arms 42—43 descend by the retraction of the plunger 29, the bolts 111—112 will engage the beveled surfaces 110 of said arms 109 and be forced back into their sockets far enough to move past said arms 109, after which said bolts will again be thrust out into operative position under said arms by the springs 114. When the car bed is restored to its horizontal position after having been dumped to the right, it will be prevented from going over too far by the locking-bar 71 which, as has been explained, is then locked in operative position. As the bed returns to its horizontal position, the locking-bar 72 is moved out to its operative position by the guide 79, thereby moving the guide-bar 89 in the same direction. As soon as said guide-bar has been moved out until its inner end reaches the recess 104 of the latch 98, the bolt 93, under the action of its spring 97, will thrust the inner end of said guide-bar upward, rotating the shaft 105 in the opposite direction, which operation will be assisted by gravity owing to the weight of the projecting arms 108. Thus, the guide-bar 89 will again resume its locking engagement with said latch and the locking-bar 72 will be held against inward movement. The arms 108—109 are normally supported in a substantially horizontal position by fixed stops 116 which are engaged by lugs 117 carried by the shafts 105—106, as shown in Fig. 4.

That which I claim as my invention, and desire to secure by Letters Patent, is:—

1. A dump-car comprising a suitable support, a car bed mounted upon said support and adapted to tilt to discharge its load, a laterally-movable member for normally holding the car bed in operative position, and an adjustable guide carried by the car-bed for moving said laterally-movable member.

2. A dump-car, comprising a suitable support, a car bed mounted upon said support and adapted to tilt to discharge its load, means for elevating one side of the bed to tilt the same, a laterally-movable member at the opposite side of the car bed and adapted to bear against the bottom thereof for normally preventing downward movement of that side of the bed, and a guide carried by the car bed for moving said laterally-movable member, said guide being adjustable to compensate for wear.

3. A dump-car, comprising a suitable support, a car bed mounted upon said support and adapted to tilt to discharge its load, means for elevating one side of the bed to tilt the same, a laterally-movable member at the opposite side of the car bed and adapted to bear against the bottom thereof for normally preventing downward movement of that side of the bed, a guide for said laterally-movable member pivotally mounted on the under side of the car bed adjacent to the transverse center thereof, and means connecting the outer portion of said guide to the car bed.

4. A dump-car comprising a suitable support, a car bed mounted upon said support and adapted to tilt to discharge its load, a laterally-movable member for normally holding the car bed in operative position, an arm connected with said member, and a latch mounted on said support and movable to lock or release said arm.

5. A dump-car, comprising a suitable support, a car bed mounted on said support and adapted to be tilted to discharge its load, means mounted on said support for elevating one side of the bed to tilt the same, a rocking member underlying the opposite side of the bed for normally preventing downward movement of that side of the bed, an arm connected with said rocking member, a rock-shaft, and a latch carried by said rock-shaft and adapted to engage said arm for locking said rocking member in operative position.

6. A dump car, comprising a suitable support, a car bed mounted on said support and adapted to be tilted to discharge its load, means mounted on said support for elevating one side of the bed to tilt the same, a rocking member underlying the opposite side of the bed for normally preventing downward movement of that side of the bed, an arm connected with said rocking member, means coöperating with said arm for preventing endwise movement thereof, when said rocking member and said arm are in operative position, and means for normally holding said arm in operative position.

7. A dump car, comprising a suitable support, a car bed mounted on said support and adapted to be tilted to discharge its load, means mounted on said support for elevating one side of the bed to tilt the same, a rocking member underlying the opposite side of the bed for normally preventing downward movement of that side of the bed, an arm connected with said rocking member, means coöperating with said arm for preventing endwise movement thereof when said rocking member and said arm are in operative position, and spring actuated means for normally holding said arm in operative position.

8. A dump-car, comprising a suitable support, a car bed mounted on said support and adapted to be tilted to discharge its load, power-operated means mounted on said support for elevating one side of the bed to tilt the same, a rocking member underlying the opposite side of the bed for normally preventing downward movement of that side of the bed, an arm connected with said rocking member, a rock-shaft, a latch carried by said rock-shaft and movable by the rocking of said shaft into or out of position to engage said arm for locking or releasing said rocking member, and means operated by the actuation of said power-operated means for rocking said shaft to release said arm.

9. A dump-car, comprising a suitable support, a car bed mounted on said support and adapted to be tilted to discharge its load, power-operated means mounted on said support for elevating one side of the bed to tilt the same, a rocking member underlying the opposite side of the bed for normally preventing downward movement of that side of the bed, an arm connected with said rocking member, a rock-shaft, a latch carried by said rock-shaft and adapted to engage said arm for locking said rocking member in operative position, means operated by the actuation of said power-operated means for rocking said shaft to release said arm, and a guide carried by the car bed for moving said rocking member out of operative position when the opposite side of the bed is elevated.

10. A dump-car, comprising a suitable support, a car bed mounted on said support and adapted to be tilted to discharge its load, means mounted on said support for elevating one side of the bed to tilt the same, a rocking member underlying the opposite side of the bed for normally preventing downward movement of that side of the bed, an arm connected with said rocking member, a rock-shaft, a latch carried by said rock-shaft and adapted to engage said arm for locking said rocking member in operative position, said latch having a recess adapted to receive one end of said arm and lugs at opposite sides of said recess adapted to ride on said arm when the latter is moved transversely of the car, and a spring-operated member for holding said arm in engagement with said latch.

11. A dump-car, comprising a suitable support, a car bed mounted on said support and adapted to be tilted to discharge its load, power-operated means mounted on said support for elevating one side of the bed to tilt the same, a rocking member underlying the opposite side of the bed for normally preventing downward movement of that side of the bed, an arm connected with said rocking member, a rock-shaft, a latch carried by said rock-shaft and adapted to engage said arm for locking said rocking member in operative position, said latch having a recess adapted to receive one end of said arm and lugs at opposite sides of said recess adapted to ride on said arm when the latter is moved transversely of the car, a spring-operated member for holding said arm in engagement with said latch, and means operated by the actuation of said power-operated means for rocking said shaft to release said arm.

12. A dump car, comprising a suitable support, a car bed mounted on said support and adapted to be tilted to discharge its load, a power operated plunger mounted on said support, means operated by said plunger for elevating one side of the bed to tilt the same, a rocking member underlying the opposite side of the bed for normally preventing downward movement of that side of the bed, an arm connected with said rocking member, means coöperating with said arm for preventing endwise movement thereof, means for normally holding said arm in operative position, a vertically swinging arm connected with said plunger and with said support, and means carried by said vertically swinging arm and operating to release said first-mentioned arm to permit endwise movement thereof when said vertically swinging arm is moved upward by the projection of said plunger.

13. A dump-car, comprising a suitable support, a car bed mounted on said support and adapted to be tilted to discharge its load, a power-operated plunger mounted on said support, means operated by said plunger for elevating one side of the bed to tilt the same, a rocking member underlying the opposite side of the bed for normally preventing downward movement of that side of the bed, an arm connected with said rocking member, a rock-shaft, a latch carried by said rock-shaft and adapted to engage said arm for preventing endwise movement thereof, a vertically-swinging arm connected with said plunger and with said support, an arm carried by said rock-shaft adjacent to the plane of movement of said vertically-swinging arm, and a spring-projected member for actuating said rock-shaft arm when said vertically-swinging arm is moved upward by the projection of said plunger, and arranged to permit said latter arm to move downward past said rock-shaft arm.

14. A dump-car, comprising a suitable support, a car bed mounted on said support and adapted to be tilted to discharge its load, a power-operated plunger mounted on said support, means operated by said plunger for elevating one side of the bed to tilt the same, a rocking member underlying the opposite side of the bed for normally preventing downward movement of that side of the bed, an arm connected with said rocking member, a rock-shaft, a latch carried by said rock-shaft and adapted to engage said arm for preventing endwise movement thereof, a vertically-swinging arm connected with said plunger and with said support, an arm carried by said rock-shaft adjacent to the plane of movement of said vertically-swinging arm, and a spring-projected member carried by said vertically-swinging arm for actuating said rock-shaft arm when said vertically-swinging arm is moved upward by the projection of said plunger, and arranged to permit said latter arm to move downward past said rock-shaft arm.

15. In a dump-car, the combination with a suitable support and a bed adapted to tilt to discharge its load, of a thrust-bar pivotally connected with the bed at one side of the axis thereof and depending therefrom, power-operated means mounted on said support and adapted to operatively engage the lower end portion of said thrust-bar for elevating that side of the bed, a laterally-movable strut underlying the opposite side of the bed for holding the same in operative position, means for locking said strut in operative position, and means operated by the actuation of said power-operated means for releasing said strut to permit the car bed to be tilted.

16. In a dump-car, the combination with a suitable support and a bed adapted to tilt to discharge its load, of a folding thrust-bar comprising members connected together by a knuckle-joint, one of said members operatively engaging the car bed at one side of the axis thereof, a power-operated plunger mounted on said support, a push-rod connected with said plunger and adapted to engage the lower end portion of said thrust-bar when the members thereof are alined, to move the same endwise, a link pivoted to said support and connected with the lower member of said thrust bar for guiding the same, a block carried by said link, and laterally-projecting means carried by said push-rod and adapted to engage said block for maintaining the line of thrust inside of the joint of said thrust-bar as the upper end portion of said thrust-bar is carried over by the tilting of the car bed.

17. In a dump-car, the combination with a suitable support and a bed adapted to tilt to discharge its load, of a folding thrust-bar comprising members connected together by a knuckle-joint, one of said members being pivotally connected with the car bed at one side of the axis thereof, a plunger mounted on said support, a push-rod carried by said plunger and adapted to engage the lower end portion of said thrust-bar when the members thereof are alined, to move the same endwise for tilting the car bed, a link pivoted to said support and connected with the lower member of said thrust-bar for guiding the same, a block carried by said link and laterally-projecting means carried by said push-rod and adapted to engage said block for maintaining the line of thrust inside of the joint of said thrust-bar as the upper end of said thrust-bar is carried over by the tilting of the bed.

THOMAS R. McKNIGHT.